United States Patent
Chang

(10) Patent No.: US 12,032,708 B2
(45) Date of Patent: Jul. 9, 2024

(54) REMOTE ACCESS METHOD, ELECTRONIC DEVICE, AND STORAGE MEDIUM

(71) Applicant: Fulian Precision Electronics (Tianjin) Co., LTD., Tianjin (CN)

(72) Inventor: Lu-Ta Chang, Taoyuan (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 266 days.

(21) Appl. No.: 17/852,348

(22) Filed: Jun. 28, 2022

(65) Prior Publication Data

US 2023/0018230 A1 Jan. 19, 2023

(30) Foreign Application Priority Data

Jul. 14, 2021 (CN) .......................... 202110796010.0

(51) Int. Cl.
*G06F 21/60* (2013.01)
*G06F 21/31* (2013.01)
*G06F 21/44* (2013.01)

(52) U.S. Cl.
CPC ............ *G06F 21/604* (2013.01); *G06F 21/31* (2013.01); *G06F 21/44* (2013.01)

(58) Field of Classification Search
CPC . H04L 9/32; H04L 9/3226; H04L 9/28; G06F 21/30; G06F 21/60; G06F 21/604
See application file for complete search history.

(56) References Cited

U.S. PATENT DOCUMENTS

| | | | | |
|---|---|---|---|---|
| 10,972,444 B1* | 4/2021 | Schiesser | ................ | H04L 63/10 |
| 11,768,832 B1* | 9/2023 | Lee | ......................... | G06F 16/93 |
| | | | | 707/715 |
| 2014/0359144 A1* | 12/2014 | Kruse | ................. | H04L 65/1104 |
| | | | | 709/228 |
| 2022/0150797 A1* | 5/2022 | Yin | ....................... | H04W 24/08 |
| 2023/0063043 A1* | 3/2023 | Grover | .................... | G06F 21/64 |

FOREIGN PATENT DOCUMENTS

TW     I628934     7/2018

* cited by examiner

*Primary Examiner* — Boris D Grijalva Lobos
(74) *Attorney, Agent, or Firm* — ScienBiziP, P.C.

(57) ABSTRACT

A remote access method obtains a remote access function instruction including a first item parameter value, a first interface parameter value, a first cmdlist parameter value, and a first keylist parameter value. An access mode to a remote computer is determined according to the first item parameter value. A login type of the remote computer is determined according to the first interface parameter value and the access mode. After the remote computer is logged into, data is retrieved from the remote computer according to the first cmdlist parameter value. The data is processed according to the first keylist parameter value. The method improves access efficiency to remote computers.

20 Claims, 6 Drawing Sheets

FIG. 3

REMOTE ACCESS METHOD, ELECTRONIC DEVICE, AND STORAGE MEDIUM

FIELD

The subject matter herein generally relates to remote access, specifically a remote access method, an electronic device, and a storage medium.

BACKGROUND

A method to access a remote computer is to call an external module such a secure shell (SSH) online module, a telnet module, or an external program calling module. A developer needs to learn a lot of knowledge related to such external modules and deals with a lot of tedious program code. Another method to access a remote computer is to develop a remote access program. To develop the remote access program, the developer needs to learn a scripting language such as Visual Basic for Applications (VBA), Java Script, or Tera Term Language (TTL). Each of the methods is time-consuming and labor-intensive.

BRIEF DESCRIPTION OF THE DRAWINGS

FIG. 3 shows an instruction table in one embodiment of the present disclosure.

DETAILED DESCRIPTION

For clarity of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
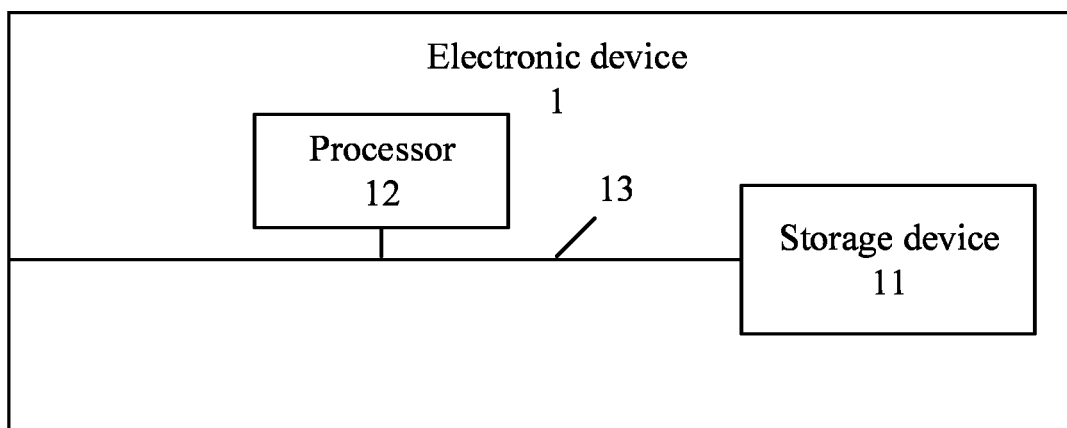
FIG. 1 is a block diagram of an electronic device implementing a remote access method in one embodiment of the present disclosure.

FIG. 1 is a block diagram of an electronic device implementing a remote access method in one embodiment of the present disclosure. The electronic device 1 includes, but is not limited to, a storage device 11, at least one processor 12, and a communication bus 13. The storage device 11 and at least one processor 12 are connected via the communication bus 13 or connected directly.

The electronic device 1 can be any electronic product that can interact with a user, such as a personal computer, a tablet computer, a smart phone, a personal digital assistant (PDA), a smart wearable device, etc. Those skilled in the art will understand that electronic device 1 is only an example, and does not constitute a limitation. Other examples of electronic device 1 may include more or fewer components than shown in FIG. 1, or combine some components, or have different components. For example, the electronic device 1 may further include an input/output device, a network access device, and the like.

Figure 2:
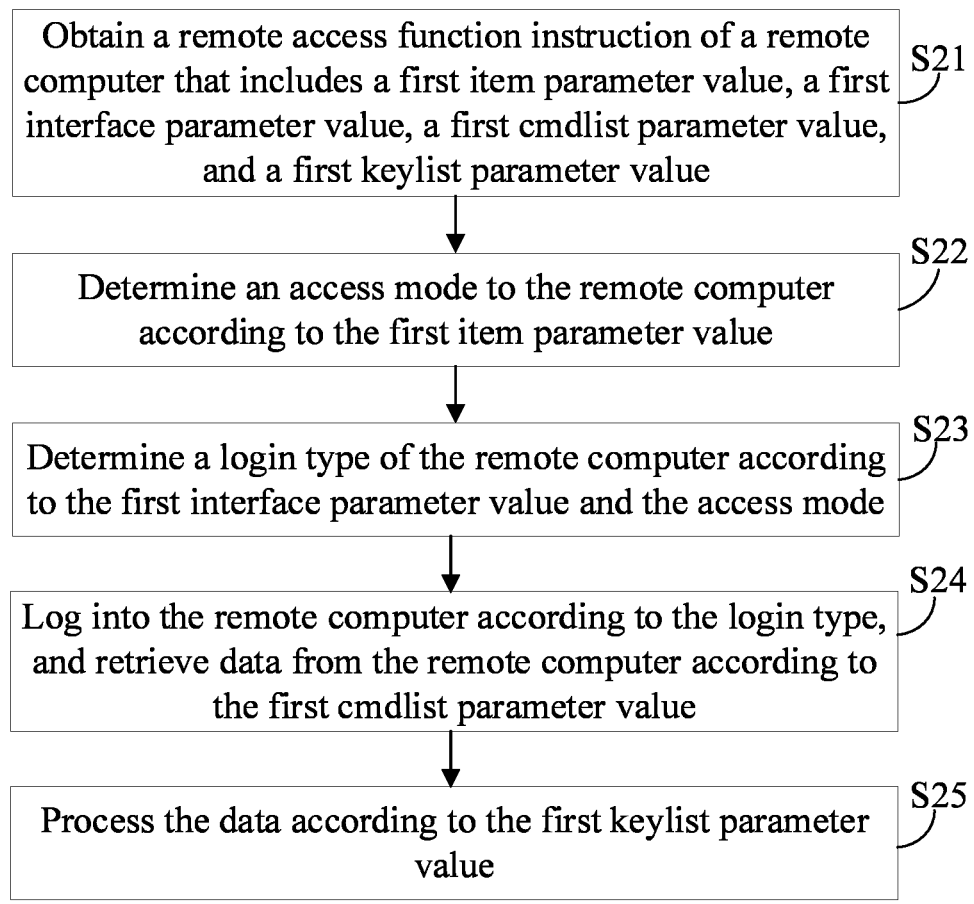
FIG. 2 is a flowchart of the method in one embodiment of the present disclosure.

FIG. 2 is a flowchart of a remote access method in one embodiment. The method may be executed by an electronic device (e.g., electronic device 1 in FIG. 1). The method can improve an access efficiency of the electronic device to remote computers. According to different requirements, the order of the blocks in the flowchart may be changed, and some blocks may be omitted.

In block S21, the electronic device obtains a remote access function instruction of a remote computer. The remote access function instruction can include a first item parameter value, a first interface parameter value, a first cmdlist parameter value, and a first keylist parameter value of the remote computer.

A remote access function instruction (such as netcmds.exec) can be used in program code. The program code can be written in Python programming language. The remote access function instruction can further include a first Internet Protocol (IP) address, a first user account, and a first password of the remote computer. The first IP address is an IP address of the remote computer. The first user account is a user account for logging into the remote computer. The first password is a password for logging into the remote computer. The first item parameter value, the first interface parameter value, the cmdlist parameter value, and the first keylist parameter value can be extracted from a preset first archive according to the first IP address. In one example, the remote access function instruction is "netcmds.exec ('172.16.222.61', 'sysadmin', 'superuser', '[1s,ps_aswww, df]', '/var,/run', 'ssh', 1)."

If the number of remote computers is small, the electronic device can log into each remote computer according to the remote access function instruction of the remote computer. No cumbersome remote access program code is required, login time is saved, and login efficiency is improved.

Figure 3:
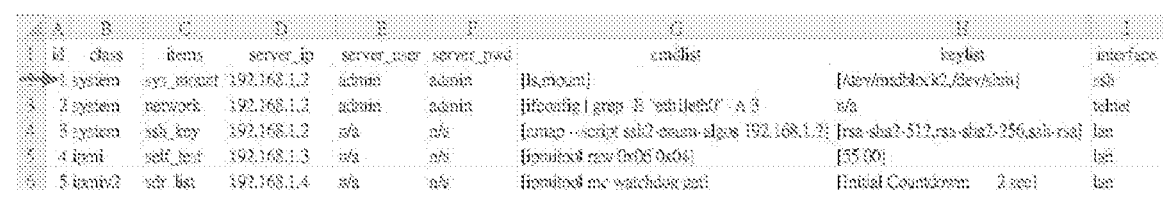

If the number of remote computers is large, a lot of program code needs to write, which is time-consuming and labor-intensive. In one embodiment, when the number of remote computers is large, the electronic device can generate an instruction table. The instruction table stores parameter values of the large number of remote computers. For each remote computer, the instruction table can store a second IP address, a second user account, a second server password, a second item parameter value, a second interface parameter value, a second cmdlist parameter value, and a second keylist parameter value of the remote computer. FIG. 3 shows an instruction table in one embodiment of the present disclosure. In FIG. 3, "items" denotes the second item parameter value, "server_ip" denotes the second IP address, "server_user" denotes the second user account, "server_pwd" denotes the second server password, "cmdlist" denotes the second cmdlist parameter value, "keylist" denotes the second keylist parameter value, and "interface" denotes the second interface parameter value.

In one embodiment, the second item parameter value, the second interface parameter value, the second cmdlist parameter value, and the second keylist parameter value can be set according to the second IP address, the second user account, and the second server password. The remote computer can be allocated different sets of parameter values.

In block S22, the electronic device determines an access mode to the remote computer according to the first item parameter value.

When the number of remote computers is small, the electronic device can access each remote computer according to the remote access function instruction of the remote computer. When the number of remote computers is large, the electronic device can access each remote computer according to the instruction table.

In one embodiment, the electronic device determines whether the first item parameter value is 1 or 0. If the first item parameter value is 1, the electronic device determines that the access mode is a first mode that reads parameter values in the remote access function instruction. If the first item parameter value is 0, the electronic device determines that the access mode is a second mode and reads parameter values in the instruction table. If the first item parameter value is neither 1 nor 0, the electronic device determines that the access mode is a hybrid mode. The hybrid mode combines the first mode and the second mode.

The access mode is used for determining how to read parameter values of the remoter computer.

In block S23, the electronic device determines a login type of the remote computer according to the first interface parameter value and the access mode.

In one embodiment, when the access mode is the first mode, the electronic device determines whether the first interface parameter value is lan, ssh or telnet. If the first interface parameter value is lan, the electronic device logs into the remote computer by executing a local program. If the first interface parameter value is ssh, the electronic device logs into the remote computer through a secure shell protocol. If the first interface parameter value is telnet, the electronic device logs into the remote computer through a telecommunication network interface.

In one embodiment, when the access mode is the second mode, the electronic device sets the first interface parameter value as the second interface parameter value, and determines whether the first interface parameter value is lan, ssh or telnet. If the first interface parameter value is lan, the electronic device logs into the remote computer by executing the local program. If the first interface parameter value is ssh, the electronic device logs into the remote computer through the secure shell protocol. If the first interface parameter value is telnet, the electronic device logs into the remote computer through the telecommunication network interface.

In one embodiment, when the access mode is the hybrid mode, the electronic device extracts each parameter value from the remote access function instruction, and determines whether each extracted parameter value is 0. If no extracted parameter value is 0, the electronic device makes a first determination of whether the first interface parameter value is lan, ssh or telnet, and determines the login type according to the first determination. If any extracted parameter value is 0 and the second item parameter value is same as the first item parameter value, the electronic device reads the second interface parameter value from the instruction table, makes a second determination of whether the second interface parameter value is lan, ssh or telnet, and determines the login type according to the second determination.

By determining the login type of the remote computer according to the first interface parameter value and the access mode, there is no need to develop cumbersome program code to access the remote computer, a lot of time for program development is saved. Functions of ssh connection, telnet connection, external program calling, command table, and table lookup are achieved conveniently. An efficiency of remote access is improved.

In block S24, the electronic device logs into the remote computer according to the login type, and retrieves data from the remote computer according to the first cmdlist parameter value.

In one embodiment, when the access mode is the first mode, the electronic device executes instructions according to the first cmdlist parameter value, and obtains the data after executing the instructions. When the access mode is the second access mode, the electronic device sets the first cmdlist parameter value as the second cmdlist parameter value, executes the instructions according to the first cmdlist parameter value, and obtains the data after executing the instructions. When the access mode is the hybrid mode, the electronic device sets the first cmdlist parameter value as the cmdlist parameter value in the new parameter values, executes the instructions according to the first cmdlist parameter value, and obtains the data after executing the instructions.

In block S25, the electronic device processes the data according to the first keylist parameter value.

In one embodiment, when the access mode is the first mode, the electronic device determines whether the first keylist parameter value is n/a. If the first keylist parameter value is n/a, the electronic device transmits the data back to the remote computer. If the first keylist parameter value is not n/a, the electronic device determines whether the data includes the first keylist parameter value, transmits the data back to the remote computer when the data includes the first keylist parameter value, and generates a failure notification when the data does not include the value of the first keylist parameter.

In one embodiment, when the access mode is the second mode, the electronic device sets the first keylist parameter value as the second keylist parameter value, and determines whether the first keylist parameter value is n/a. If the first keylist parameter value is n/a, the electronic device transmits the data back to the remote computer and reading parameter values of a next row in the instruction table. If the first keylist parameter value is not n/a, the electronic device determines whether the data includes the first keylist parameter value. If the data includes the first keylist parameter value, the electronic device transmits the data back to the remote computer and reads the parameter values of the next row in the instruction table. If the data does not include the value of the first keylist parameter, the electronic device generates a failure notification.

In one embodiment, when the access mode is the hybrid mode, the electronic device sets the first keylist parameter value as the keylist parameter value in the new parameter values, and determines whether the first keylist parameter value is n/a. If the first keylist parameter value is n/a, the electronic device transmits the data back to the remote computer. If the first keylist parameter value is not n/a, the electronic device determines whether the data includes the first keylist parameter value. If the data includes the first keylist parameter value, the electronic device transmits the data back to the remote computer. If the data does not include the value of the first keylist parameter, the electronic device generates a failure notification.

By using the access mode, the electronic device can automatically determine instruction set to be executed and data set to be processed, and remote access automation is achieved.

Figure 4:
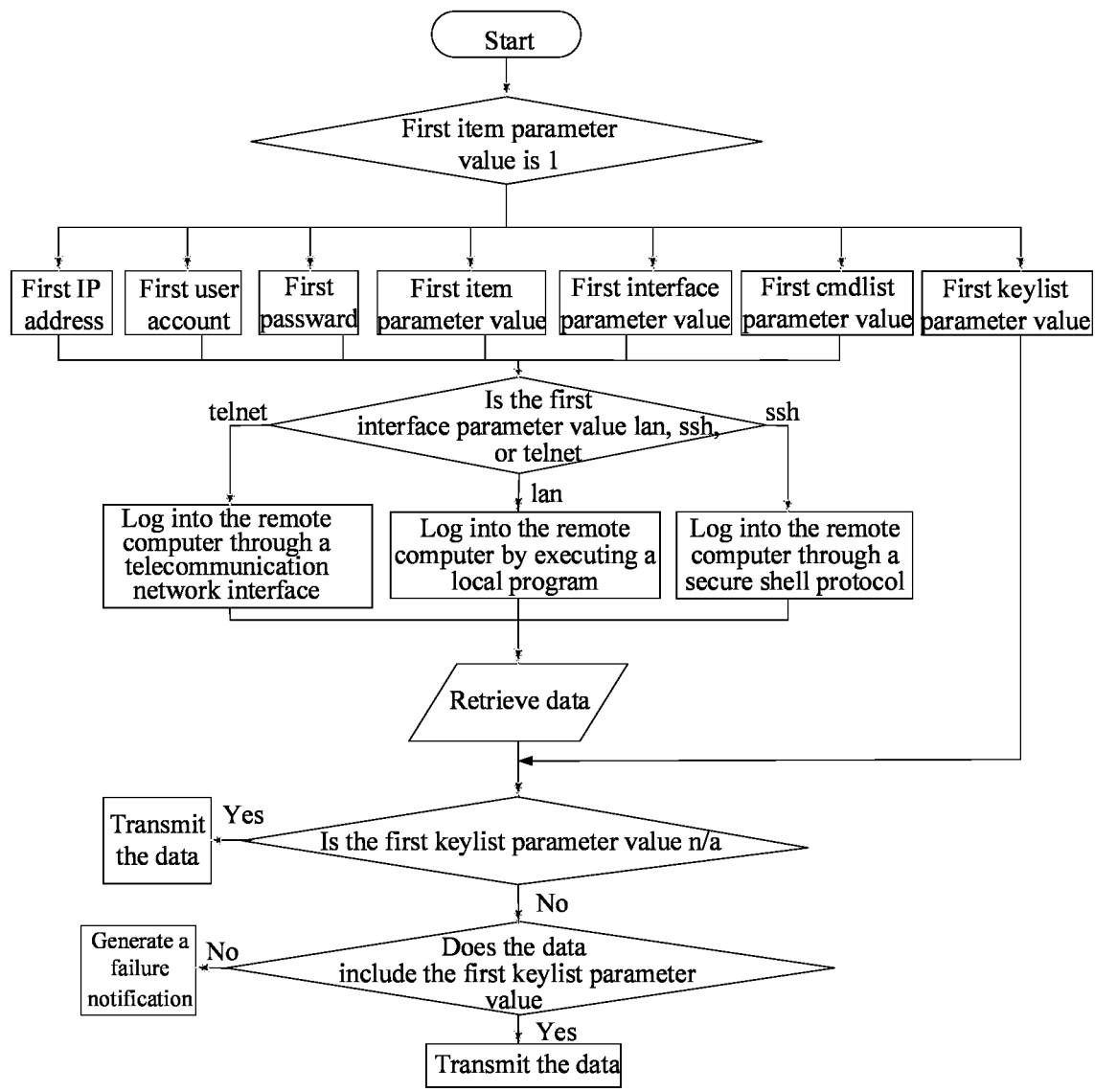
FIG. 4 is a flowchart of the method when an access mode of the electronic device is a first mode in one embodiment of the present application.

FIG. 4 is a flowchart of the method when the access mode is the first mode in one embodiment of the present application.

When the first item parameter value is 1, the electronic device determines that the access mode is a first mode that reads parameter values in the remote access function instruction. The electronic device determines whether the first interface parameter value is lan, ssh or telnet. If the first interface parameter value is lan, the electronic device logs into the remote computer by executing a local program. If the first interface parameter value is ssh, the electronic device logs into the remote computer through a secure shell protocol. If the first interface parameter value is telnet, the electronic device logs into the remote computer through a telecommunication network interface. The electronic device executes instructions according to the first cmdlist parameter value, and obtains the data after executing the instructions. The electronic device determines whether the first keylist parameter value is n/a. If the first keylist parameter value is n/a, the electronic device transmits the data back to the remote computer. If the first keylist parameter value is not n/a, the electronic device determines whether the data includes the first keylist parameter value, transmits the data back to the remote computer when the data includes the first keylist parameter value, and generates a failure notification when the data does not include the value of the first keylist parameter.

Figure 5:
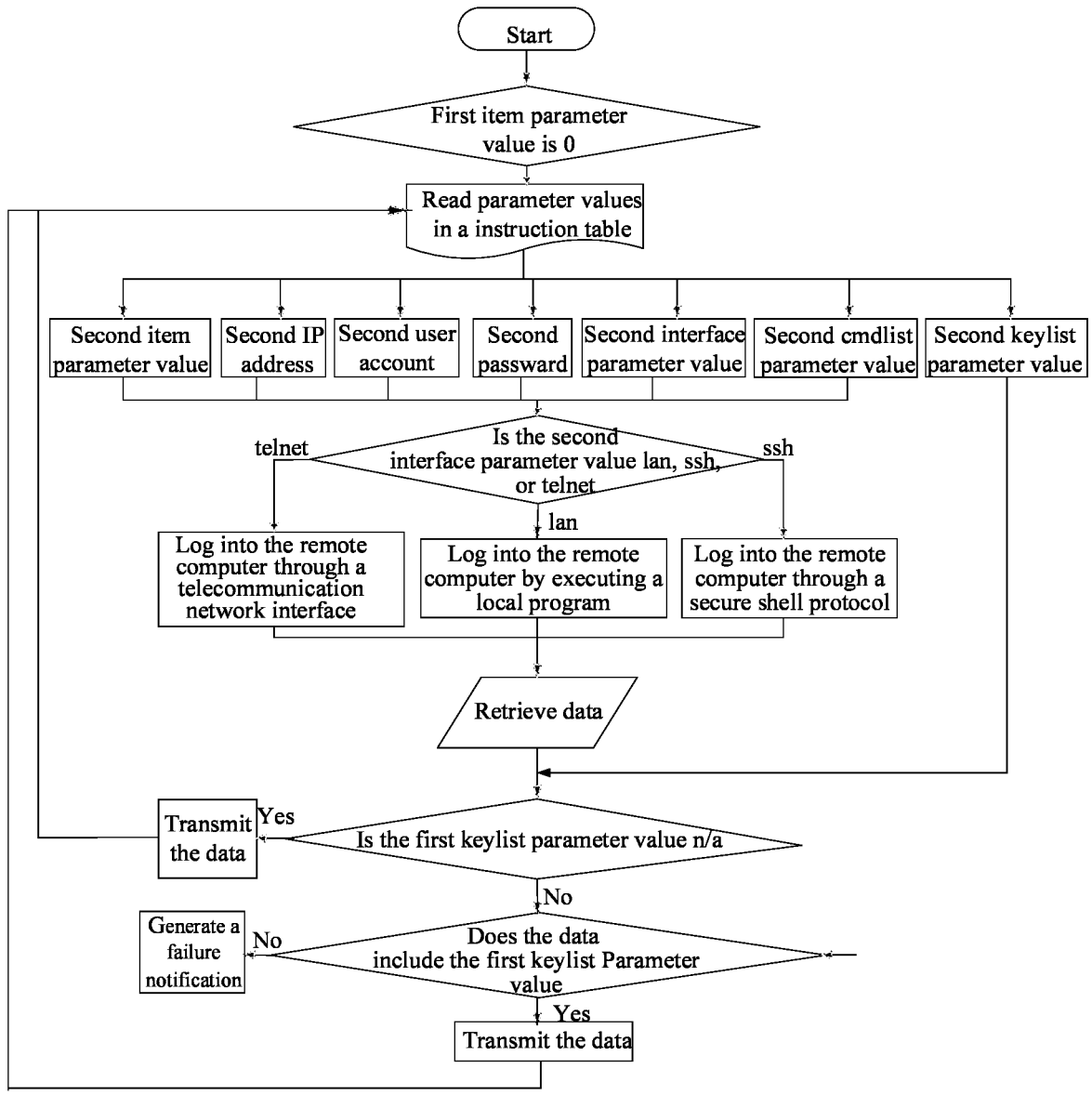
FIG. 5 is a flowchart of the method when the access mode of the electronic device is a second mode in one embodiment of the present application.

FIG. 5 is a flowchart of the method when the access mode is the second mode in one embodiment of the present application.

When the first item parameter value is 0, the electronic device determines that the access mode is a second mode and reads parameter values in the instruction table. The electronic device sets the first interface parameter value as the second interface parameter value, and determines whether the first interface parameter value is lan, ssh or telnet. If the first interface parameter value is lan, the electronic device logs into the remote computer by executing the local program. If the first interface parameter value is ssh, the electronic device logs into the remote computer through the secure shell protocol. If the first interface parameter value is telnet, the electronic device logs into the remote computer through the telecommunication network interface. The electronic device sets the first cmdlist parameter value as the second cmdlist parameter value, executes the instructions according to the first cmdlist parameter value, and obtains the data after executing the instructions. The electronic device sets the first keylist parameter value as the second keylist parameter value, and determines whether the first keylist parameter value is n/a. If the first keylist parameter value is n/a, the electronic device transmits the data back to the remote computer and reading parameter values of a next row in the instruction table. If the first keylist parameter value is not n/a, the electronic device determines whether the data includes the first keylist parameter value. If the data includes the first keylist parameter value, the electronic device transmits the data back to the remote computer and reads the parameter values of the next row in the instruction table. If the data does not include the value of the first keylist parameter, the electronic device generates a failure notification.

Figure 6:
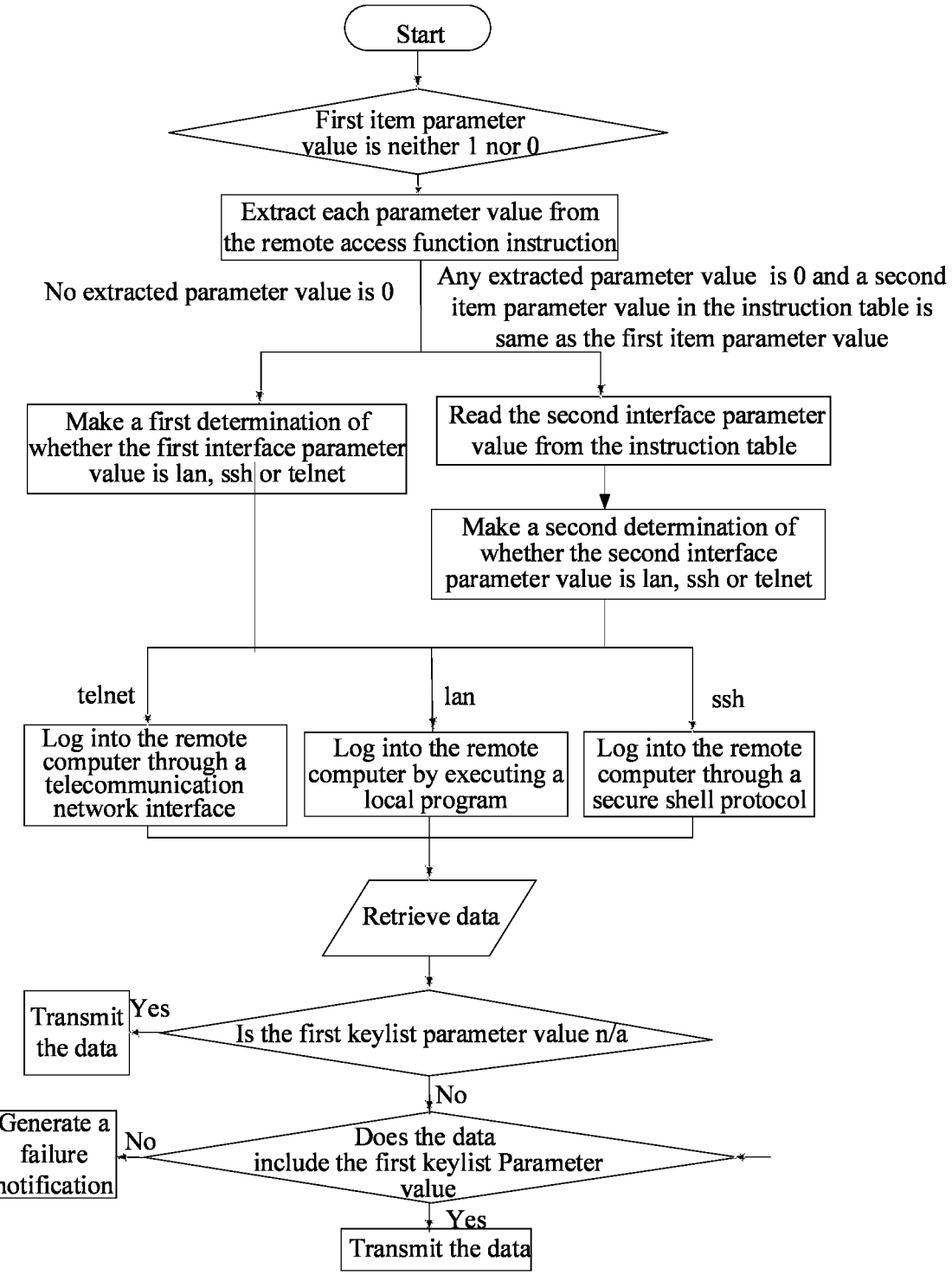
FIG. 6 is a flowchart of the method when the access mode of the electronic device is a hybrid mode in one embodiment of the present application.

FIG. 6 is a flowchart of the method when the access mode is the hybrid mode in one embodiment of the present application.

When the first item parameter value is neither 1 nor 0, the electronic device determines that the access mode is a hybrid mode. The electronic device extracts each parameter value from the remote access function instruction, and determines whether each extracted parameter value is 0. If no extracted parameter value is 0, the electronic device makes a first determination of whether the first interface parameter value is lan, ssh or telnet, and determines the login type according to the first determination. If any extracted parameter value is 0 and the second item parameter value is same as the first item parameter value, the electronic device reads the second interface parameter value from the instruction table, makes a second determination of whether the second interface parameter value is lan, ssh or telnet, and determines the login type according to the second determination. The electronic device sets the first cmdlist parameter value as the cmdlist parameter value in the new parameter values, executes the instructions according to the first cmdlist parameter value, and obtains the data after executing the instructions. The electronic device sets the first keylist parameter value as the keylist parameter value in the new parameter values, and determines whether the first keylist parameter value is n/a. If the first keylist parameter value is n/a, the electronic device transmits the data back to the remote computer. If the first keylist parameter value is not n/a, the electronic device determines whether the data includes the first keylist parameter value. If the data includes the first keylist parameter value, the electronic device transmits the data back to the remote computer. If the data does not include the value of the first keylist parameter, the electronic device generates a failure notification.

In FIG. 1, a computer program may be stored in the storage device 11 and executable by the processor 12. The processor 12 may execute the computer program to implement the blocks in the method described above, such as the blocks S21 to S25 in FIG. 1.

The storage device 11 may be an internal memory of the electronic device 1, that is, a memory built into the electronic device 1. The storage device 11 may also be an external memory of the electronic device 1, that is, a memory externally connected to the electronic device 1.

The storage device 11 is used for storing program codes and various data, and accesses programs and data during the operation of the electronic device 1.

The storage device 11 may include a storage program area and a storage data area. The storage program area may store an operating system, and programs required by at least one function, etc.; the storage data area may store data and the like created in the use of the electronic device 1. In addition, the storage device 11 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 12 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 12 may be a microprocessor or any conventional processor. The processor 12 may be a control center of the electronic device 1, and connect various parts of the entire electronic device 1 by using various interfaces and lines.

In an exemplary embodiment, the computer program may be divided into one or more modules, and the one or more modules are stored in the storage device 11 and executed by the processor 12 to complete the method of the present disclosure. The one or more modules can be a series of computer-readable instruction segments capable of performing specific functions, and the instruction segments are used to describe execution processes of the computer program in the electronic device 1.

When the modules integrated in the electronic device 1 are implemented in the form of software functional units and used as independent units, they can be stored in a non-transitory readable storage medium. According to this understanding, all or part of the processes in the method of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the electronic device 1 may also include a power source (such as a battery) for supplying power to various components. The power source may be logically connected to the at least one processor 12 through a power management device, so as to realize functions such as charging, discharging, and power consumption management. The power supply may also include direct current or alternating current power supplies, recharging devices, power failure detection circuits, power converters or inverters, and power status indicators. The electronic device 1 may also include various sensors, BLUETOOTH modules, WI-FI modules, etc.

In several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the method.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

I claim:

1. A remote access method comprising:
    obtaining a remote access function instruction comprising a first item parameter value, a first interface parameter value, a first cmdlist parameter value, and a first keylist parameter value;
    determining an access mode to a remote computer according to the first item parameter value;
    determining a login type of the remote computer according to the first interface parameter value and the access mode;
    logging into the remote computer according to the login type, and retrieving data from the remote computer according to the first cmdlist parameter value; and
    processing the data according to the first keylist parameter value.

2. The remote access method of claim 1, wherein determining an access mode to a remote computer according to the first item parameter value comprises:
    determining whether the first item parameter value is 1 or 0;
    when the first item parameter value is 1, determining that the access mode is a first mode that reads parameter values in the remote access function instruction;
    when the first item parameter value is 0, determining that the access mode is a second mode that reads parameter values in an instruction table, the parameter values in the instruction table comprising a second keylist parameter value, a second interface parameter value, and a second item parameter value; and
    when the first item parameter value is neither 1 nor 0, determining that the access mode is a hybrid mode that combines the first mode and the second mode.

3. The remote access method of claim 2, wherein when the access mode is the second mode, determining a login type of the remote computer according to the first interface parameter value and the access mode comprises:
    setting the first interface parameter value as the second interface parameter value;
    determining whether the first interface parameter value is lan, ssh or telnet;

when the first interface parameter value is lan, logging into the remote computer by executing a local program;

when the first interface parameter value is ssh, logging into the remote computer through a secure shell protocol; and when the first interface parameter value is telnet, logging into the remote computer through a telecommunication network interface.

4. The remote access method of claim 2, wherein when the access mode is the hybrid mode, determining a login type of the remote computer according to the first interface parameter value and the access mode comprises:

extracting each parameter value from the remote access function instruction, and determining whether each extracted parameter value is 0;

when no extracted parameter value is 0, making a first determination of whether the first interface parameter value is lan, ssh or telnet, and determining the login type according to the first determination; and when any extracted parameter value is 0 and the second item parameter value is same as the first item parameter value, reading the second interface parameter value from the instruction table, making a second determination of whether the second interface parameter value is lan, ssh or telnet, and determining the login type according to the second determination.

5. The remote access method of claim 2, wherein when the access mode is the first mode, processing the data according to the first keylist parameter value comprises:

determining whether the first keylist parameter value is n/a;

when the first keylist parameter value is n/a, transmitting the data back to the remote computer; and when the first keylist parameter value is not n/a, determining whether the data comprises the first keylist parameter value, transmitting the data back to the remote computer when the data comprises the first keylist parameter value, and generating a failure notification when the data does not comprise the value of the first keylist parameter.

6. The remote access method of claim 2, wherein when the access mode is the second mode, processing the data according to the first keylist parameter value comprises:

setting the first keylist parameter value as the second keylist parameter value;

determining whether the first keylist parameter value is n/a;

when the first keylist parameter value is n/a, transmitting the data back to the remote computer and reading parameter values of a next row in the instruction table; and when the first keylist parameter value is not n/a, determining whether the data comprises the first keylist parameter value, transmitting the data back to the remote computer and reading the parameter values of the next row in the instruction table when the data comprises the first keylist parameter value, and generating a failure notification when the data does not comprise the value of the first keylist parameter.

7. The remote access method of claim 4, wherein retrieving data from the remote computer according to the first cmdlist parameter value comprises:

when the access mode is the first mode, executing instructions according to the first cmdlist parameter value, and obtaining the data after executing the instructions;

when the access mode is the second access mode, setting the first cmdlist parameter value as the second cmdlist parameter value, executing the instructions according to the first cmdlist parameter value, and obtaining the data after executing the instructions; and when the access mode is the hybrid mode, setting the first cmdlist parameter value as the cmdlist parameter value in the new parameter values, executing the instructions according to the first cmdlist parameter value, and obtaining the data after executing the instructions.

8. An electronic device comprising:

at least one processor; and a storage device storing computer-readable instructions, which when executed by the at least one processor, cause the at least one processor to:

obtain a remote access function instruction comprising a first item parameter value, a first interface parameter value, a first cmdlist parameter value, and a first keylist parameter value;

determine an access mode to a remote computer according to the first item parameter value;

determine a login type of the remote computer according to the first interface parameter value and the access mode;

log into the remote computer according to the login type, and retrieve data from the remote computer according to the first cmdlist parameter value; and process the data according to the first keylist parameter value.

9. The electronic device of claim 8, wherein the at least one processor is further caused to:

determine whether the first item parameter value is 1 or 0;

when the first item parameter value is 1, determine that the access mode is a first mode that reads parameter values in the remote access function instruction;

when the first item parameter value is 0, determine that the access mode is a second mode that reads parameter values in an instruction table, the parameter values in the instruction table comprising a second keylist parameter value, a second interface parameter value, and a second item parameter value; and when the first item parameter value is neither 1 nor 0, determine that the access mode is a hybrid mode that combines the first mode and the second mode.

10. The electronic device of claim 9, wherein when the access mode is the second mode, the at least one processor is further caused to:

set the first interface parameter value as the second interface parameter value;

determine whether the first interface parameter value is lan, ssh or telnet;

when the first interface parameter value is lan, log into the remote computer by executing a local program;

when the first interface parameter value is ssh, log into the remote computer through a secure shell protocol; and when the first interface parameter value is telnet, log into the remote computer through a telecommunication network interface.

11. The electronic device of claim 9, wherein when the access mode is the hybrid mode, the at least one processor is further caused to:

extract each parameter value from the remote access function instruction, and determine whether each extracted parameter value is 0;

when no extracted parameter value is 0, make a first determination of whether the first interface parameter value is lan, ssh or telnet, and determine the login type according to the first determination; and when any extracted parameter value is 0 and the second item parameter value is same as the first item parameter value, read the second interface parameter value from the instruction table, make a second determination of whether the second interface parameter value is lan, ssh or telnet, and determine the login type according to the second determination.

12. The electronic device of claim 9, wherein when the access mode is the first mode, the at least one processor is further caused to:
determine whether the first keylist parameter value is n/a;
when the first keylist parameter value is n/a, transmit the data back to the remote computer; and
when the first keylist parameter value is not n/a, determine whether the data comprises the first keylist parameter value, transmit the data back to the remote computer when the data comprises the first keylist parameter value, and generate a failure notification when the data does not comprise the value of the first keylist parameter.

13. The electronic device of claim 9, wherein when the access mode is the second mode, the at least one processor is further caused to:
set the first keylist parameter value as the second keylist parameter value;
determine whether the first keylist parameter value is n/a;
when the first keylist parameter value is n/a, transmit the data back to the remote computer and read parameter values of a next row in the instruction table; and
when the first keylist parameter value is not n/a, determine whether the data comprises the first keylist parameter value, transmit the data back to the remote computer and read the parameter values of the next row in the instruction table when the data comprises the first keylist parameter value, and generate a failure notification when the data does not comprise the value of the first keylist parameter.

14. The electronic device of claim 9, wherein the at least one processor is further caused to:
when the access mode is the first mode, execute instructions according to the first cmdlist parameter value, and obtain the data after executing the instructions;
when the access mode is the second access mode, set the first cmdlist parameter value as the second cmdlist parameter value, execute the instructions according to the first cmdlist parameter value, and obtain the data after executing the instructions; and
when the access mode is the hybrid mode, set the first cmdlist parameter value as the cmdlist parameter value in the new parameter values, execute the instructions according to the first cmdlist parameter value, and obtain the data after executing the instructions.

15. A non-transitory storage medium having stored thereon computer-readable instructions that, when the computer-readable instructions are executed by a processor to implement the following method:
obtaining a remote access function instruction comprising a first item parameter value, a first interface parameter value, a first cmdlist parameter value, and a first keylist parameter value;
determining an access mode to a remote computer according to the first item parameter value;
determining a login type of the remote computer according to the first interface parameter value and the access mode;
logging into the remote computer according to the login type, and retrieving data from the remote computer according to the first cmdlist parameter value; and
processing the data according to the first keylist parameter value.

16. The non-transitory storage medium of claim 15, wherein determining an access mode to a remote computer according to the first item parameter value comprises:
determining whether the first item parameter value is 1 or 0;
when the first item parameter value is 1, determining that the access mode is a first mode that reads parameter values in the remote access function instruction;
when the first item parameter value is 0, determining that the access mode is a second mode that reads parameter values in an instruction table, the parameter values in the instruction table comprising a second keylist parameter value, a second interface parameter value, and a second item parameter value; and
when the first item parameter value is neither 1 nor 0, determining that the access mode is a hybrid mode that combines the first mode and the second mode.

17. The non-transitory storage medium of claim 16, wherein when the access mode is the second mode, determining a login type of the remote computer according to the first interface parameter value and the access mode comprises:
setting the first interface parameter value as the second interface parameter value;
determining whether the first interface parameter value is lan, ssh or telnet;
when the first interface parameter value is lan, logging into the remote computer by executing a local program;
when the first interface parameter value is ssh, logging into the remote computer through a secure shell protocol; and
when the first interface parameter value is telnet, logging into the remote computer through a telecommunication network interface.

18. The non-transitory storage medium of claim 16, wherein when the access mode is the hybrid mode, determining a login type of the remote computer according to the first interface parameter value and the access mode comprises:
extracting each parameter value from the remote access function instruction, and determining whether each extracted parameter value is 0;
when no extracted parameter value is 0, making a first determination of whether the first interface parameter value is lan, ssh or telnet, and determining the login type according to the first determination; and
when any extracted parameter value is 0 and the second item parameter value is same as the first item parameter value, reading the second interface parameter value from the instruction table, making a second determination of whether the second interface parameter value is lan, ssh or telnet, and determining the login type according to the second determination.

19. The non-transitory storage medium of claim 16, wherein when the access mode is the first mode, processing the data according to the first keylist parameter value comprises:
determining whether the first keylist parameter value is n/a;
when the first keylist parameter value is n/a, transmitting the data back to the remote computer; and when the first keylist parameter value is not n/a, determining whether the data comprises the first keylist parameter value, transmitting the data back to the remote computer when the data comprises the first keylist parameter value, and generating a failure notification when the data does not comprise the value of the first keylist parameter.

20. The non-transitory storage medium of claim 16, wherein when the access mode is the second mode, processing the data according to the first keylist parameter value comprises:

setting the first keylist parameter value as the second keylist parameter value;

determining whether the first keylist parameter value is n/a;

when the first keylist parameter value is n/a, transmitting the data back to the remote computer and reading parameter values of a next row in the instruction table; and when the first keylist parameter value is not n/a, determining whether the data comprises the first keylist parameter value, transmitting the data back to the remote computer and reading the parameter values of the next row in the instruction table when the data comprises the first keylist parameter value, and generating a failure notification when the data does not comprise the value of the first keylist parameter.

* * * * *